(12) United States Patent
Schröter et al.

(10) Patent No.: US 12,091,521 B2
(45) Date of Patent: Sep. 17, 2024

(54) COMPOSITIONS FOR PRODUCING FOAMED MATERIALS

(71) Applicant: BAKELITE GMBH, Iserlohn-Letmathe (DE)

(72) Inventors: Stephan Schröter, Essen (DE); Rosel Bölke, Herdecke (DE); Daniel Dahlhaus, Heiden (DE)

(73) Assignee: BAKELITE GMBH (DE)

( * ) Notice: Subject to any disclaimer, the term of this patent is extended or adjusted under 35 U.S.C. 154(b) by 720 days.

(21) Appl. No.: 17/276,103

(22) PCT Filed: Sep. 25, 2019

(86) PCT No.: PCT/EP2019/075911
§ 371 (c)(1),
(2) Date: Mar. 12, 2021

(87) PCT Pub. No.: WO2020/069940
PCT Pub. Date: Apr. 9, 2020

(65) Prior Publication Data
US 2022/0041827 A1 Feb. 10, 2022

(30) Foreign Application Priority Data

Oct. 1, 2018 (EP) ..................................... 18198059

(51) Int. Cl.
| | | |
|---|---|---|
| *C08J 9/00* | (2006.01) | |
| *C08G 8/36* | (2006.01) | |
| *C08J 9/14* | (2006.01) | |
| *C08L 61/14* | (2006.01) | |

(52) U.S. Cl.
CPC .............. *C08J 9/0061* (2013.01); *C08G 8/36* (2013.01); *C08J 9/141* (2013.01); *C08L 61/14* (2013.01); *C08J 2203/182* (2013.01); *C08J 2361/10* (2013.01); *C08J 2461/14* (2013.01); *C08L 2205/02* (2013.01)

(58) Field of Classification Search
CPC .... C08J 9/0061; C08J 9/141; C08J 2203/182; C08J 2361/10; C08J 2461/14; C08G 8/36; C08L 61/14; C08L 2205/02
USPC .......................................................... 521/88
See application file for complete search history.

(56) References Cited

U.S. PATENT DOCUMENTS

| | | | | |
|---|---|---|---|---|
| 5,032,642 A * | 7/1991 | Lemon | ..................... | C08G 8/32 523/147 |
| 5,795,933 A * | 8/1998 | Sharp | ....................... | C08K 5/10 524/596 |
| 2004/0082713 A1* | 4/2004 | Tutin | ....................... | C08L 61/14 524/596 |
| 2014/0303269 A1* | 10/2014 | Dahlhaus | ................. | C08G 8/34 521/181 |

FOREIGN PATENT DOCUMENTS

| | | | |
|---|---|---|---|
| DE | 2647390 | 4/1977 | |
| DE | 2647390 A1 | 4/1977 | |
| GB | 1029033 A | 12/1962 | |
| GB | 1522115 A * | 8/1978 | ............... C08J 9/00 |
| JP | 2005075938 | 3/2005 | |
| JP | 2006273899 | 10/2006 | |

* cited by examiner

*Primary Examiner* — Michael M. Bernshteyn
(74) *Attorney, Agent, or Firm* — Edmonds & Cmaidalka, P.C.

(57) ABSTRACT

The invention relates to a composition for the production of foams based on phenolic resin, use thereof, and a process for the production of the composition. For provision of a composition for the production of foams based on phenolic resin, where the said composition delivers improved reaction to fire with, in essence, no alteration of further important foam properties, it is proposed that the composition comprises an alkoxylated novolak, wherein the novolak is produced using phenol, cresol and/or xylenol.

16 Claims, No Drawings

COMPOSITIONS FOR PRODUCING FOAMED MATERIALS

The present invention relates to a composition for the production of foams based on phenolic resin, use thereof, and a process for the production of the composition.

Because foams based on phenolic resins have a high closed-cell content, they have advantageous thermal insulation properties and therefore have important applications as sealing material and insulation material in the construction sector and in mining and tunnel construction. They are generally based on aqueous resols, which are processed to give a phenolic resin foam by means of a blowing agent and of a hardener, with or without supply of heat.

The process for the production of phenolic resin foams based on resols where an aqueous phenolic resol is mixed with a blowing agent and with a hardener is well known (e.g. DE 37 187 24 A1). DE 33 244 31 A1 moreover says that foamable phenolic resol compositions can also comprise surface-active agents. DE 28 182 87 A moreover discloses use of mixtures of resols and novolaks for the production of phenol-formaldehyde foams.

However, it has been found that all these known compositions for phenolic resin foams require improvement in respect to their reaction to fire or fire performance. It is therefore not sufficient that when the foam is used as insulation material it self-extinguishes (that the foam self-extinguishes after brief exposure to a flame) and generates no smoke. Specifically, it is also necessary to ensure that in the event of a fire no hot pieces break away (quantified as spall rate) from the insulation foam; these have an extremely adverse effect on the course of a fire for example in residential accommodation.

It is therefore an object of the present invention to provide a composition for the production of foams based on phenolic resin, where the said composition delivers improved reaction to fire with, in essence, no alteration of further important foam properties. A particular intention is to optimize thermal conductivity, friability and reaction to fire (fire performance).

The said object is achieved according to the invention in that the composition for the production of foams based on phenolic resin comprises an alkoxylated novolak, wherein the novolak is produced using phenol, cresol and/or xylenol.

This solution was unexpected, because experiments using addition of unmodified novolak based on phenolic raw materials and formaldehyde revealed increased thermal conductivity of the hardened foam, this being undesirable for a conventional use of the foam as insulation material. The use, according to the invention, of an alkoxylated novolak firstly improves reaction to fire and secondly reduces thermal conductivity.

The condensate for the foam based on phenolic resin is produced by conventional condensation of a phenolic compound, for example selected from a phenol and/or cresol, preference being given here to phenol because of easy accessibility, and formaldehyde, in a molar ratio of from 1:1.0 to 1:3.0. Preference is given to a molar ratio of from 1:1.3 to 1:2.3, because the ratio of free formaldehyde to phenol is then optimized and monomer content in the final product is minimized. The condensation uses from 0.15 to 5% by weight, based on the quantity of the raw materials used, of a basic catalyst (e.g. KOH, NaOH, Ba(OH)2, triethylamine), preferably from 0.3 to 1.5% by weight. Formaldehyde is added, and the condensation reaction proceeds at temperatures of from 50 to 100° C., within a period of from 30 to 150 min. Preference is given to temperatures of from 75 to 85° C. within a period of from 50 to 70 min, giving optimized exothermicity control of the reaction.

The reaction is continued until the chain length of the condensate is such that the molar mass of the condensate present in the reaction mixture is from Mw 400 to 800 g/mol-Mw measured by means of gel permeation chromatography (GPC—commercially available method, separation columns: 6 columns in series, column packing: cross-linked polystyrene, eluent: THF, detector: UV 280 nm, calibration substance: phenol novolak). Condensates with higher molar mass are often not preferred because of the higher viscosity of the resin. In this case the blowing agent is no longer able to foam the resin, the final result being undesired defects in the foam. A phenol-formaldehyde condensate (phenolic resol resin) is obtained, and this can be used for the production of the composition of the invention.

The composition of the invention is obtained when an alkoxylated novolak is added to the phenolic resol resin or is condensed. The said novolak is produced via reaction of novolak with, for example, alkylene oxides, e.g. ethylene oxide and/or propylene oxide, and/or alkylene carbonates, e.g. ethylene carbonate and/or propylene carbonate. However, it is also possible to use other alkoxylating agents.

The novolak used for the production of the alkoxylated novolak is known from the prior art: these materials are produced by a condensation reaction of phenol, cresol, and/or xylenol, with formaldehyde or acetaldehyde in a ratio of from 5:1 to 1.1:1, with use of an acidic catalyst (e.g. mineral acids or oxalic acid). This produces novolaks with a varying number of phenol units, preference being given here to novolaks with Mn from 200-500 g/mol. (Mn measured by vapor pressure osmometry—Vapor Pressure Osmometer the company Knauer GmbH, Berlin, device No.: 8003201, 800560. Solutions of the resins in the range of 0.5 to 1.0 g/l in tetrahydrofuran (>99% dried over molecular sieve). In order to determine the molecular weight, the temperature difference between the samples and the pure solvent in the osmometer measuring cell was determined by individual determination at 45° C. In this method, by knowing the concentration with the temperature difference, the corresponding vapor pressure reduction can be used as a measure of the molar mass. The device was calibrated with Benzil for reference). The resulting alkoxylated novolaks have adequate compatibility with the aqueous phenol-formaldehyde condensate (resole). When novolaks with higher Mn values are used to produce the alkoxylated novolacs, it is mostly necessary to add a solvent such as ethanol, ethylene glycol, or diethylene glycol, in order to increase compatibility. Preference is given to phenol novolaks because their easy use of manufacture and better compatibility with aqueous systems, e.g. in comparison to alkylphenol novolaks.

The alkoxylation reaction is generally carried out in an alkaline medium at temperatures of from 120° C. to 200° C. The novolak is generally used as initial charge and melted, and an alkaline medium in the form of, for example, potassium carbonate, sodium carbonate, potassium hydroxide, sodium hydroxide, potassium alcoholates, sodium alcoholates, calcium hydroxide, calcium oxide, amines or triphenylphosphine, is added, with stirring. The alkoxylating agent is then added. It is preferable to use, for each mole of hydroxyl (OH) group of the novolak unit, from 0.1 mol to 1.2 mol of alkoxylating agent, e.g. propoxylating agent and/or ethoxylating agent. It is particularly preferable that the degree of alkoxylation of the alkoxylated novolak is from 5 to 100%, preferably from 30 to 100%. At degrees of alkoxylation>30%, a balanced relationship between thermal conductivity and reaction to fire is found in the foamed product. After the reaction the alkoxylated novolak can be neutralized by various acids (inorganic or organic acids).

Polyalkoxylated novolaks can be produced also by other methods known from prior art.

It is also possible to mix different alkoxylated novolaks in different ratios to one another, e.g. ethoxylated novolak and propoxylated novolak. It is therefore possible to use a physical mixture, for example of alkoxylated novolak (co-condensate) and/or ethoxylated novolak and/or propoxylated novolak.

The novolak is also advantageously reacted with a propoxylating agent, for example propylene oxide or propylene carbonate, because propoxylating agents, e.g. propylene carbonate, are liquid at room temperature and are therefore easier to handle, for example in comparison with ethylene carbonate (solid at room temperature).

Use of the ethoxylated novolak and/or propoxylated novolak has proved to be advantageous because, in addition to the balanced thermal conductivity/reaction to fire relationship, good compatibility with the phenol resol resin is obtained, with resultant technical processing advantages.

It is moreover possible to use a polyalkoxylated novolak. The expression polyalkoxylated novolaks means products alkoxylated by using one or more alkoxylating agents in a molar ratio of 2 1, based on one phenolic OH group of the novolak. It is possible here to use novolaks having a polyether glycol chain length of from 1 to 10, more preferably from 1 to 5. It is therefore possible by way of example to use polyethoxylated novolaks. The following structure may be given here by way of examples:

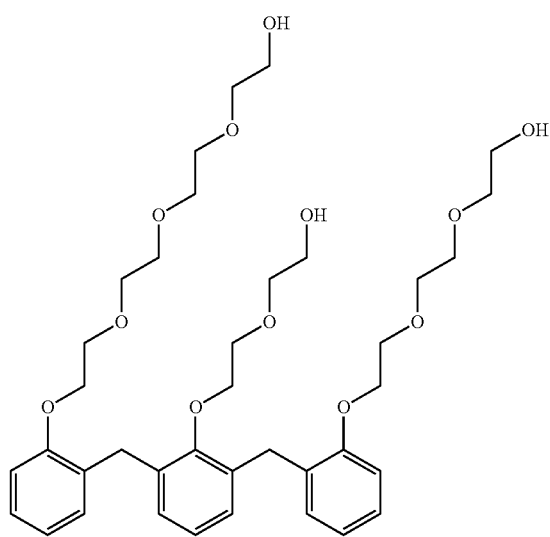 [SMILES: OCCOCCOCCOCCOc1ccccc1Cc1cccc(Cc2ccccc2OCCOCCOCCO)c1OCCOCCO]

It has been found that an alkoxylated novolak with molar mass from Mn 200 to 3000 g/mol is particularly suitable for the composition of the invention. At higher molar masses of the alkoxylated novolak, the viscosity of the composition of the invention is increased and a decreased compatibility with the resol is observed, with a resultant effect on foam structure. Particular preference is given to alkoxylated novolaks with molar mass from Mn 200 to 2000 g/mol. The determination of Mn was carried out—as already described above—by means of vapor pressure osmometry.

It is particularly preferable that the quantity present of the alkoxylated novolak is from 5 to 50% by weight, preferably from 5 to 30% by weight, based on the weight of the condensate used of a phenolic compound and formaldehyde. Increased proportion of alkoxylated novolak gives better reaction to fire with low thermal conductivity.

Unexpectedly, the foam produced with the composition of the invention has excellent reaction to fire, in particular a low spall rate, while other foam properties, in particular thermal conductivity, but also friability, closed-cell content and compressive strength, are in essence unaltered, and are therefore extremely suitable for applications for protection from fire, heat, low temperatures and noise.

As already mentioned, the foam composition of the invention preferably comprises, as component, a phenol-formaldehyde condensate (phenol resol resin) and an alkoxylated novolak based on phenol, cresol and/or xylenol.

The composition of the invention can comprise, as further components, additives (e.g. flame retardants, processing aids, plasticizers (e.g. dimethyl phthalate, diethylene glycol), neutralizing reagents or reactivity-influencing substances, surfactants (e.g. alkylsulfonates), solvents (e.g. triethyl phosphate and/or diethylene glycol), emulsifiers, plastifying agents), hardeners and/or blowing agents.

The emulsifiers can be selected from adducts of ethylene oxide and/or of propylene oxide onto saturated or unsaturated fatty acids, hydroxy fatty acids, fatty alcohols, glycerides or vegetable oils and/or ethoxylated castor oil and/or mixtures thereof, and are usually used at a concentration of from 2 to 7% by weight, based on the entirety of all of the components. Quantities<2% by weight and >7% by weight lead to restricted homogeneity of mixing, and partial demixing of the components of the composition of the invention could thus occur.

It is moreover possible that there is/are one or more hardeners (e.g. inorganic or organic acids, for example phosphoric acid, sulfuric acid, phenolsulfonic acids, p-toluenesulfonic acid, xylenesulfonic acid) present in the composition of the invention. The quantity of hardener(s) mixed into the material is usually from 8 to 20% by weight, based on the quantity of components used.

Substances used as blowing agents are those conventional in the prior art, e.g. isopentane, cyclopentane, butane, pentane, isopropyl chloride, hexane, heptane, halogenated hydrocarbons (like HFC, HFO) and/or mixtures thereof at a conventional concentration of from 2 to 10% by weight, preferably 4 to 8% by weight, based on the quantity of all components used. As a rule, no foaming takes place at a concentration of the blowing agent<2% by weight, no foaming of the resin takes place. If the quantity of the blowing agent is >10% by weight, the pressure in the mould during hardening becomes excessive, and the foam collapses.

The composition of the invention is preferably used for the production of foams based on phenolic resin to improve flame resistance, spall rate, thermal insulation properties and friability. Preference is given to the use of the foams produced with the composition of the invention for insulation purposes in buildings, for example for external insulation or internal insulation under ceilings, cladding, render or sealing systems.

Production of the composition of the invention for the production of foams based on phenolic resin comprises the following steps:
  a.) production of a condensate via condensation of at least one phenolic compound and formaldehyde in a molar ratio of from 1:1.0 to 1:3.0 with the aid of a basic catalyst and optionally addition of further added substances, b.) distillation, preferably at from 40-60° C. in vacuum, of the condensate produced in a), c.) addition of an alkoxylated novolak, preferably at from 40-60° C., and addition of, if desired, further added substances before and/or after distillation.

Addition of the alkoxylated novolak can accordingly take place directly after the production or storage of the condensate produced in a), which takes place under conventional conditions. This has the advantage that the alkoxylated novolak is already mixed homogeneously into the material during the distillation to remove water, thus saving time, because an additional mixing procedure can be omitted. The reduction of water content has the advantage of improving the thermal conductivity properties of the final product (foam).

The alkoxylated novolak can generally be introduced in undiluted form, or else in the form of solution, e.g. in triethyl phosphate and/or diethylene glycol or other solvents, into the phenol resol for the production of the composition of the invention. It is thus possible to take account of process-specific parameters deriving from customer requirements.

It is also possible that the alkoxylated novolak (undiluted or in the form of solution) is mixed in a separate mixing procedure, e.g. at temperatures of from 15° C. to 60° C., into the condensate produced in a) after distillation to remove the water and optionally storage.

However, it is also generally possible that a portion of the alkoxylated novolak is added before the distillation procedure, and that a portion of the alkoxylated novolak is added after the distillation procedure. It is likewise optionally possible in step a) and/or in step c) to add further added substances, for example additives (e.g. flame retardants, processing aids, plasticizers, neutralizing reagents or substances influencing reactivity), surfactants, solvents, emulsifiers or plastifying agents.

However, it is also possible to produce the composition of the invention for the production of foams via a process with at least the following step:

production of a condensate made of at least one phenolic compound, and formaldehyde, and of an alkoxylated novolak with the aid of a basic catalyst and optionally addition of further added substances, where the phenolic compound and formaldehyde are present in a molar ratio of from 1:1.0 to 1:3.0. The reaction is preferably controlled in a manner such that the proportion of the alkoxylated novolak in the condensate is from 5 to 50% by weight, preferably from 5 to 30% by weight.

It is possible here that the components phenolic compound, formaldehyde and alkoxylated novolak are used as initial charge simultaneously, or with time-shift. It is therefore also possible that the manner of production of the composition of the invention is such that the phenolic component and the alkoxylated novolak are used as initial charge, and condensation with formaldehyde is carried out with use of an alkaline catalyst.

The foam is produced with use of the composition of the invention generally after admixture of the blowing agent at room temperature, addition of the hardener, and introduction of the mixture into a mould in which hardening takes place in the usual manner at temperatures of from 40 to 70° C.

The invention will be explained in more detail with reference to an embodiment:

a.) Production of the ethoxylated novolak
1. 126.21 g of phenol are charged as solid into a reactor and melted at temperatures of from 55 to 60° c.
2. 0.374 g of oxalic acid dihydrate and 0.374 g of water are then added, with stirring, and the reaction mixture is heated to from 100° c. to 110° c. 32.257 g of 45% formalin are then added over a period of 1 h at from 100° C. to 110° C., whereupon reaction continued for 3 h at reflux. The novolak was distilled in order to reduce free phenol content (<0.1%) and water content.
3. For the ethoxylation of the resultant novolak, 0.174 g of potassium carbonate was directly added at from 170 to 180° C. into the resin, and mixed into the material. 58.714 g of ethylene carbonate are fed into the mixture over a period of 5 h at from 175 to 180° C. Carbon dioxide is liberated. The feed time can optionally be increased as far as 8 h, in accordance with the technical capability of discharging carbon dioxide.
4. For the continued reaction, the temperature is maintained at from 175° C. to 180° C. for 1 h, or else optionally for longer, until no further carbon dioxide is produced and the reaction has been concluded.
5. The reaction mixture is cooled to 150° C., and 0.347 g of salicylic acid is added.
6. Once the product has been further cooled (100° C.), it can be drawn off.

Data for the ethoxylated novolak:
Melting range: 25+/–IO OC
Cone-on-plate viscosity at 1000 C: 300±200 mPa*s
Water content by Karl Fischer method: max. 0.30%
Molar mass (Mn) by vapor pressure osmometry.: 485 f 50 g/mol
Degree of alkoxylation (GC-MS, sil): >95% b.) Production of a polyethoxylated novolak
1000 g of a novolak with a Mn of 270 g/mol was melted at 95° C., and 4.2 g of a 100% KOH solution, and 8.4 g of water, were added. The water was removed by distillation in vacuum at from 100 to 120° C.

In a temperature range from 140° C. to 150° C., taking account of the exothermicity, 2181 g of ethylene oxide (5 mol) were slowly added, and for the continued reaction the temperature was maintained at from 150° C. to 160° C. The resultant product was cooled to 800 C and neutralized with 6.7 g of lactic acid.

Data for the polyethoxylated novolak:
Viscosity at 25° C.: 2240 mPa*s
Water content: max. 0.24%
Density at 20° C.: 1.16 g/ml c) Production of the phenol-formaldehyde condensate/alkoxylated novolak (foam resin) composition The foam resin was produced by mixing, in a laboratory reactor with stirrer, 100 g of phenol with 108.5 g of formaldehyde (45% aqueous solution) and 3.6 g of KOH (50% aqueous solution). This solution is heated to 960 C, with stirring. The reaction mixture was cooled to 45° C. in the reaction vessel, and an appropriate quantity of non-alkoxylated novolak (Comparative Examples in Table 1) and of alkoxylated novolak (inventive embodiments in Tables 2 to 4) was admixed, and the mixture was homogenized with stirring. The percentage of non-alkoxylated novolak and alkoxylated novolak refers to the weight of the phenolformaldehyde-condensate (foam resin). Water was then removed by distillation under reduced pressure.

d) Production of the foam
The following were added in succession, with stirring, to 354.4 g of the foam resin produced in c): 15.1 g of ethoxylated castor oil and 29.6 g of a blowing agent mixture consisting of 85% by weight of isopentane and 15% by weight of cyclopentane. Finally, 48.0 g of hardener consisting of 80% by weight of phenolsulfonic acid and 20% by weight of phosphoric acid (75%) were stirred into the mixture.

The reaction mixture was immediately transferred into a wooden mould preheated to 60° C., securely closed by a screw-threaded wooden lid. The mould was placed into an oven controlled to a temperature of 60° C. After one hour, the foaming process had concluded, and the foam could be demoulded. The foam was then post-cured at 600 C in the oven for 24 hours.

Friability was calculated by determining the loss of mass from a premoulded foam cube (edge length 25 mm), placed in a wooden cube (edge length 200 mm) with lid rotating at a speed of 60 rpm (12 determinations).

Closed cell content was measured in accordance with "EN ISO 4590—Rigid cellular plastics—Determination of the volume percentage of open cells and of closed cells", and the lambda values (λ-value) were determined in accordance with ISO 8301—"Thermal insulation—Determination of steady-state thermal resistance and related properties—Heat flow meter apparatus".

Reaction to fire was assessed by measuring the spall rate and the flame resistance by holding the flame of a Bunsen burner at a distance of 10 cm from a sample of which the weight had previously been determined. After at most 5 min, the flame was removed and the weight of the spalled material was again determined. The percentage weight difference is the spall rate. If the flame penetrated the entire material before expiry of the time of 5 min, the relevant time has been stated (flame resistance) and the quantity of spalled material before that juncture has been used to calculate the spall rate. Longer time it takes for the flame to travel through the sample (improved flame resistance) and lower spall rate are measures of improved reaction to fire (fire performance). All samples were self-extinguishing and generated no smoke.

TABLE 1

| Properties | Without novolak (I) | Non-alkoxylated novolak Quantity [g]/[%] | | |
|---|---|---|---|---|
| | | 11.9/7.2 (II) | 25.1/13.8 (III) | 39.8/20.9 (IV) |
| Foam resin | | | | |
| Water content [%] | 17.0 | 18.1 | 15.5 | 16.7 |
| Free HCHO content [%] | 0.6 | 0.5 | 0.5 | 0.5 |
| Free phenol content [%] | 6.3 | 5.5 | 5.7 | 4.9 |
| Viscosity at 25° C. [mPa*s] | 2560 | 2600 | 3200 | 2640 |
| Foam | | | | |
| Density [kg/m$^3$] | 33.6 | 34.5 | 34.0 | 32.1 |
| Closed-cell content [%] | 96.6 | 95.9 | 95.8 | 89.8 |
| Friability [%] | 34.8 | 32.1 | 31.6 | 23.5 |
| λ-value [mW/m*K] | 24.1 | 29.6 | 35.8 | 35.8 |
| Spall rate [%] | 12.0 | 10.3 | 1.3 | 0.15 |
| Flame resistance | 2:47 min | 2:13 min | 3:54 min | 5:00 min |

TABLE 2

| | Degree of ethoxylation of ethoxylated novolak | | | | | |
|---|---|---|---|---|---|---|
| | 100% Quantity [g]/[%] | | | 80% Quantity [g]/[%] | | |
| Properties | 11.9/6.9 (V) | 25.1/13.0 (VI) | 39.8/18.7 (VII) | 11.9/6.6 (VIII) | 25.1/12.8 (IX) | 39.8/19.0 (X) |
| Foam resin | | | | | | |
| Water content [%] | 16.2 | 17.2 | 15.9 | 16.5 | 16.2 | 14.9 |
| Free HCHO content [%] | 0.6 | 0.5 | 0.5 | 0.6 | 0.6 | 0.5 |
| Free phenol content [%] | 5.3 | 5.1 | 4.8 | 5.4 | 4.8 | 4.5 |
| Viscosity at 25° C. [mPa*s] | 2720 | 2000 | 3040 | 2360 | 2880 | 4320 |
| Foam | | | | | | |
| Density [kg/m$^3$] | 35.3 | 34.3 | 34.7 | 35.2 | 35.6 | 35.9 |
| Closed cell content | 94.1 | 92.7 | 93.2 | 94.1 | 91.8 | 94.5 |
| Friability [%] | 37.5 | 38.0 | 36.0 | 36.8 | 32.9 | 24.7 |
| λ-value [mW/m*K] | 24.9 | 24.8 | 25.7 | 24.2 | 24.2 | 24.0 |
| Spall rate [%] | 9.2 | 2.2 | <0.1 | 10.9 | 3.5 | <0.1 |
| Flame resistance | 3:15 min | 5:00 min | 5:00 min | 2:27 min | 5:00 min | 5:00 min |

TABLE 3

| | Degree of ethoxylation of ethoxylated novolak | | | | | |
|---|---|---|---|---|---|---|
| | 50% Quantity [g]/[%] | | | 30% Quantity [g]/[%] | | |
| Properties | 11.9/6.7 (XI) | 25.1/12.8 (XII) | 39.8/18.8 (XIII) | 11.9/6.8 (XIV) | 25.1/13.0 (XV) | 39.8/18.7 (XVI) |
| Foam resin | | | | | | |
| Water content [%] | 16.6 | 16.3 | 16.0 | 16.8 | 15.9 | 17.0 |
| Free HCHO content [%] | 0.6 | 0.5 | 0.5 | 0.6 | 0.5 | 0.5 |
| Free phenol content [%] | 5.3 | 5.0 | 4.6 | 5.1 | 4.9 | 4.5 |
| Viscosity at 25° C. [mPa*s] | 3200 | 3520 | 3840 | 2520 | 3040 | 3520 |
| Foam | | | | | | |
| Density [kg/m³] | 37.6 | 39.3 | 36.2 | 37.2 | 38.2 | 36.0 |
| Closed cell content [%] | 92.5 | 93.8 | 94.4 | 92.7 | 93.1 | 93.6 |
| Friability [%] | 31.4 | 29.2 | 23.2 | 34.5 | 30.6 | 23.6 |
| Λ- value [mW/m*K] | 23.9 | 23.4 | 23.7 | 24.5 | 23.4 | 26.8 |
| Spall rate [%] | 7.0 | 0.5 | <0.1 | 11.1 | 0.1 | <0.1 |
| Flame resistance | 3:05 min | 5:00 min | 5:00 min | 2:30 min | 5:00 min | 5:00 min |

TABLE 4

| Properties | Propoxylated novolak (degree of propoxylation 100%) Quantity [g]/[%] 39.8/18.7 (XVII) |
|---|---|
| Foam resin | |
| Water content [%] | 15.7 |
| Free HCHO content [%] | 0.51 |
| Free phenol content [%] | 4.4 |
| Viscosity at 25° C. [mPa*s] | 6400 |
| Foam | |
| Density [kg/m³] | 39.4 |
| Closed cell content [%] | 93.46 |
| Friability [%] | 37.5 |
| Λ- value [mW/m*K] | 24.1 |
| Spall rate [%] | <0.1 |
| Flame resistance | >5:00 min |

Tables 1 through 4 illustrates the effect of introducing non-alkoxylated novolak and alkoxylated novolak at three different concentrations relative to the phenolic resole (without a novolak—sample (1)). The samples include both ethoxylated and propoxylated novolaks (XVII), wherein ethoxylated novolaks with varying degree of ethoxylation from 100%, 80%, 50% and 30% were used. Each table lists the critical properties of the foam such as reaction to fire as indicated by spall rate and flame resistance (time it takes to penetrate), thermal conductivity (Λ-value) and friability.

Table 1 shows that addition of non-alkoxylated novolaks also improves reaction to fire compared to the sample (1) (without novolak). However, this is accompanied by increased thermal conductivity that indicates poor thermal resistance, which is undesirable. For example, increasing the concentration of the novolak from 7.2% (II) to 13.8% (III) further reduced the spall rate and increased flame resistance. However, the Λ-value increased significantly from 29.6 to 35.8 mW/m*K.

On the contrary, introduction of the alkoxylated novolaks (Tables 2, 3 and 4) resulted in significant improvements to reaction to fire as evidenced by reduction in spall rate and high flame resistance without decreasing the thermal insulation property. These results are somewhat unexpected because introduction of an aliphatic chain by alkoxylating is typically expected to reduce flame resistance. Even more unexpected result is the improvement to reaction to fire achieved through the incorporation of propoxylated novolak which contains an additional methyl group per alkoxylation unit compared to ethoxylated novolak. Another feature that distinguishes the alkoxylated novolaks from non-alkoxylated novolaks is the level of improvements to reaction to fire that can be achieved. The lowest reduction in spall rate achieved through the non-alkoxylated novolak was 0.15% (IV—at 20.9% non-alkoxylated novolak). Samples containing a similar proportion of alkoxylated novolacs (VII, X, XIII, XVI) had a spall rate of <0.1%. The use of alkoxylated novolaks in phenolic resin-based foams thus brings more significant improvements in fire performance than the use of non-alkoxylated novolaks.

In Tables 2 and 3, it has been proved according to the invention that use of alkoxylated novolaks with increasing proportion by weight in the phenolic resin (samples: (V) to (VII); (VIII) to (X); (XI) to (Xlii); (XIV) to (XVI)) brought about improved reaction to fire with unchanged low thermal conductivity. This phenomenon was apparent even at a degree of alkoxylation as low as 30% (samples (XIV) to (XVI)).

Best results were achieved through the addition of ethoxylated novolak with a degree of ethoxylation of 50% at ca.19% concentration (XIII). This resulted in a foam that had the lowest spall rate of <0.1%, superior flame resistance of 5 minutes, lowest friability of 23.2% while retaining or improving the thermal insulation performance compared to the control foam (1). Thus, in comparison to the control foam (1), foam (XIII) exhibits >99% reduction in spall rate, 80% increase in flame resistance and a 33.3% improvement in friability.

What is claimed is:

1. A phenolic resin composition for the production of foams, the composition comprising:
   at least one phenolic resole; and
   at least one alkoxylated novolak, wherein the alkoxylated novolak is produced using phenol, cresol, xylenol, or combinations thereof, and wherein the alkoxylated novolak has a number average molecular weight (Mn) of 200 g/mol to 3,000 g/mol.

2. The composition of claim 1, wherein the degree of alkoxylation of the alkoxylated novolak is 30% to 100%.

3. The composition of claim 1, wherein the alkoxylated novolak comprises an ethoxylated novolak, a propoxylated novolak, or both.

4. The composition of claim 1, wherein the alkoxylated novolak comprises a binary mixture of ethoxylated novolak and propoxylated novolak.

5. The composition of claim 1, wherein the alkoxylated novolak is a co-condensate obtained from a reaction of at least two different alkoxylating agents with at least one non-alkoxylated novolak.

6. The composition of claim 1, wherein the alkoxylated novolak comprises a polyalkoxylated novolak.

7. The composition of claim 1, wherein the alkoxylated novolak comprises from 5 wt % to 50 wt %, based on the weight of the phenolic resole.

8. The composition of claim 1, further comprising one or more components selected from the group consisting of: additives, surfactants, emulsifiers, plastifying agents, solvents, hardeners, blowing agents, and combinations thereof.

9. A process for the production of the phenolic resin of claim 1, comprising:
   a) producing a phenol-formaldehyde condensate via condensation of at least one phenolic compound and formaldehyde in a molar ratio of from 1:1.0 to 1:3.0 with the aid of a basic catalyst,
   b) distilling the phenol-formaldehyde condensate to remove water, and
   c) adding an alkoxylated novolak to the distilled phenol-formaldehyde, wherein the alkoxylated novolak has a number average molecular weight (Mn) of 200 g/mol to 3,000 g/mol.

10. The process of claim 9 wherein the alkoxylated novolak is used in a form dissolved in a solvent or solvent mixture.

11. The process of claim 9, wherein the solvent or solvent mixture comprises triethyl phosphate, diethylene glycol, or both.

12. The process of claim 9, wherein the alkoxylated novolak has a number average molecular weight (Mn) of 200 g/mol to 2,000 g/mol.

13. The composition of claim 1, wherein the phenolic resole has a weight average molecular weight (Mw) of 400 g/mol to 800 g/mol and the alkoxylated novolak has a number average molecular weight (Mn) of 200 g/mol to 2,000 g/mol.

14. The process of claim 9, wherein the phenol-formaldehyde condensate has a weight average molecular weight (Mw) of 400 g/mol to 800 g/mol and the alkoxylated novolak has a number average molecular weight (Mn) of 200 g/mol to 2,000 g/mol.

15. The process of claim 9, wherein the alkoxylated novolak is present in an amount from 5% to 50% by weight, based on the total weight of the alkoxylated novolac and the distilled phenol-formaldehyde, and wherein the alkoxylated novolak has a number average molecular weight (Mn) of 200 g/mol to 2,000 g/mol.

16. The process of claim 15, wherein the alkoxylated novolak is an ethoxylated novolak, a propoxylated novolak, or both, and wherein the alkoxylated novolak has a degree of alkoxylation greater than 30%.

* * * * *